US010073821B2

(12) United States Patent
La Fontaine et al.

(10) Patent No.: US 10,073,821 B2
(45) Date of Patent: Sep. 11, 2018

(54) REPRESENTATION OF MULTIPLE MARKUP LANGUAGE FILES THAT DIFFER IN STRUCTURE AND CONTENT IN ONE FILE FOR THE PRODUCTION OF NEW MARKUP LANGUAGE FILES

(71) Applicant: DeltaXML Ltd, Worcestershire (GB)

(72) Inventors: Semer Geoffrey Thomas La Fontaine, Worcestershire (GB); Tristan Mitchell, Worcestershire (GB)

(73) Assignee: DeltaXML, Ltd., Worcestershire (GB)

(*) Notice: Subject to any disclaimer, the term of this patent is extended or adjusted under 35 U.S.C. 154(b) by 467 days.

(21) Appl. No.: 14/474,377

(22) Filed: Sep. 2, 2014

(65) Prior Publication Data
US 2015/0067479 A1 Mar. 5, 2015

(30) Foreign Application Priority Data

Aug. 30, 2013 (GB) .................................. 1315520.5

(51) Int. Cl.
G06F 17/22 (2006.01)
G06F 17/30 (2006.01)
G06F 8/71 (2018.01)
(52) U.S. Cl.
CPC ............ *G06F 17/2247* (2013.01); *G06F 8/71* (2013.01); *G06F 17/2211* (2013.01);
(Continued)
(58) Field of Classification Search
None
See application file for complete search history.

(56) References Cited

U.S. PATENT DOCUMENTS 8,196,135 B2* 6/2012 LaFontaine ......... G06F 17/2247
717/122
8,423,518 B2* 4/2013 Lafontaine .......... G06F 17/2288
707/692

(Continued)

FOREIGN PATENT DOCUMENTS

WO 2002/08890 1/2002
WO 2009/004386 1/2009

OTHER PUBLICATIONS

Peters, Luuk. "Change detection in XML trees: a survey." 3rd Twente Student Conference on IT. 2005. Retrieved on [Apr. 25, 2018] Retrieved from the Internet:URL<http://www-poleia.lip6.fr/~gancarsk/grbd09/2005_03_B_Peters,L.J.-Change_detection_in_XML_trees_a_survey.pdf>.*

(Continued)

*Primary Examiner* — Thuy Dao
*Assistant Examiner* — Cheneca Smith
(74) *Attorney, Agent, or Firm* — Carmody Torrance Sandak & Hennessey LLP

(57) ABSTRACT

A method and apparatus for representing two or more related markup language source files in a single delta file is provided. The markup language source files are represented in such a way that the delta file is easily processed to produce one or more merged combinations of the source files. The method and apparatus ensure that any one of the original files can be extracted from the delta file and the delta file remains a valid delta file for any remaining source files. The method and apparatus is adapted to enable the sources files to be aligned with respect to structurally significant elements and textual content so as to reduce repetitions in the delta file of common content. The method and apparatus are suited for use, but not exclusively, with XML documents and files.

21 Claims, 4 Drawing Sheets

(52) U.S. Cl.
CPC ...... *G06F 17/2229* (2013.01); *G06F 17/2288* (2013.01); *G06F 17/30106* (2013.01)

(56) References Cited

U.S. PATENT DOCUMENTS

| | | | | |
|---|---|---|---|---|
| 2002/0002567 | A1* | 1/2002 | Kanie | G06F 17/218 715/234 |
| 2003/0167446 | A1* | 9/2003 | Thomas | G06F 17/2247 715/229 |
| 2004/0205592 | A1* | 10/2004 | Huang | G06F 17/227 715/235 |
| 2005/0026130 | A1* | 2/2005 | Crowhurst | G09B 7/02 434/362 |
| 2005/0149861 | A1* | 7/2005 | Bishop | G06F 9/543 715/209 |
| 2007/0061345 | A1* | 3/2007 | Thompson | G06F 9/454 |
| 2010/0088676 | A1 | 4/2010 | Yuan et al. | |
| 2010/0138415 | A1 | 6/2010 | Lein | |
| 2010/0185706 | A1* | 7/2010 | Lafontaine | G06F 17/2288 707/822 |
| 2013/0262399 | A1* | 10/2013 | Eker | G06F 17/30371 707/687 |
| 2014/0330834 | A1* | 11/2014 | Auriemma | G06F 17/2247 707/741 |

OTHER PUBLICATIONS

Ohst et al."Difference tools for analysis and design documents." Software Maintenance, 2003. ICSM 2003. Proceedings. International Conference on. IEEE, 2003.Retreived on [Apr. 25, 2018] Retrieved from the Internet:URL<https://ieeexplore.ieee.org/document/1235402/#full-text-section>.*

LaFontaine et al., "A Generalized Grammar for Three-way XML Synchronization," pp. 1-16 (admitted prior art).

"Guidelines for Electronic Text Encoding and Interchange," Text Encoding Initiative Consortium, Charlottesville, Virginia, 2013, pp. i-1549 (admitted prior art).

"Representing Overlap in XML" / Jeni's Musings, pp. 1-2 (admitted prior art).

"Stand-off markup" from TEIWiki, pp. 1-3 (admitted prior art).

"XQuery 1.0 and Xpath 2.0 Functions and Operators," pp. 1-160 (admitted prior art).

LaFontaine et al., "Russian Dolls and XML: Handling Multiple Versions of XML in XML," XML Conference & Exposition Dec. 7-12, 2003, Philadelphia, Pennsylvania.

"XML Change Tracking, Representing Change Tracking in any XML Document," pp. 1-27 (publicly available prior to Aug. 30, 2013 and thus admitted prior art).

* cited by examiner

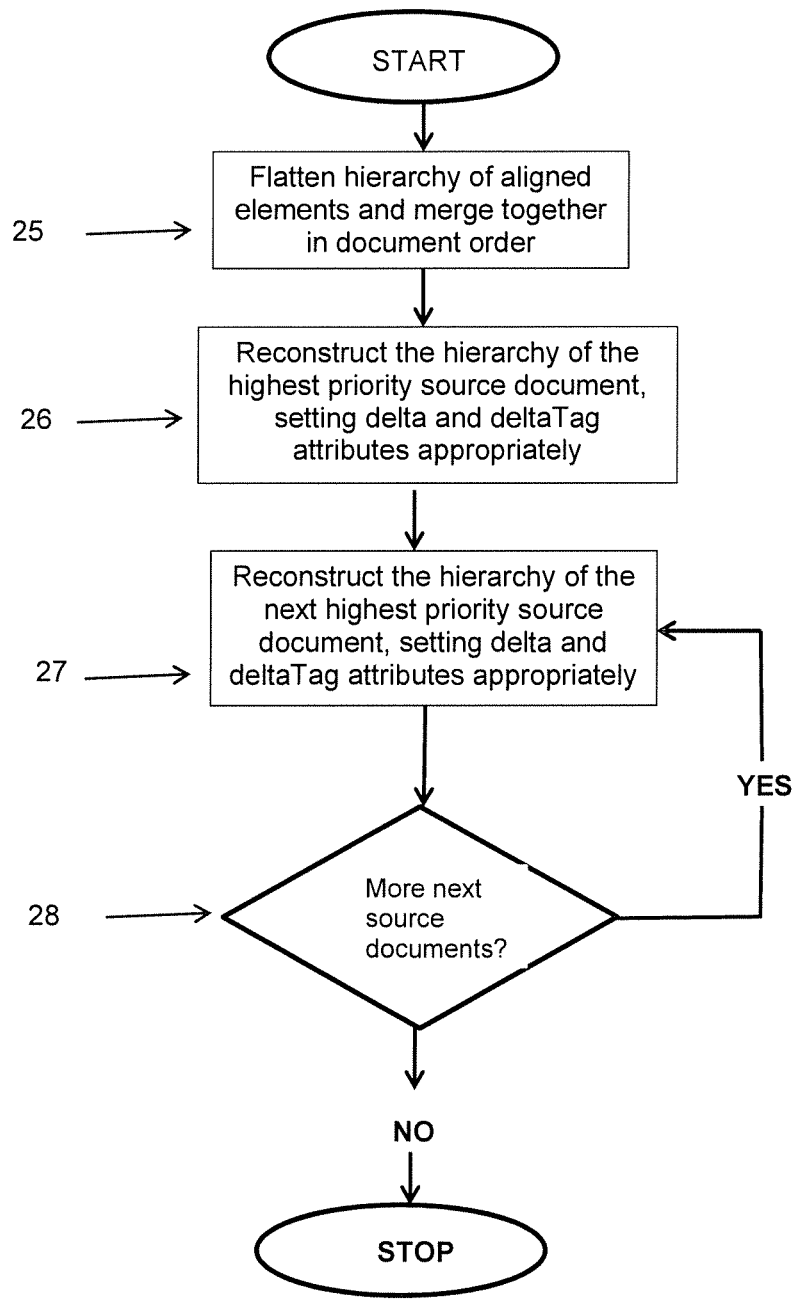

REPRESENTATION OF MULTIPLE MARKUP LANGUAGE FILES THAT DIFFER IN STRUCTURE AND CONTENT IN ONE FILE FOR THE PRODUCTION OF NEW MARKUP LANGUAGE FILES

FIELD OF THE INVENTION

The present invention relates to a method and system for representing two or more related markup language source files in a single file referred to herein as a delta file. The method and system ensure that any one of the original markup language files can be extracted from the delta file. More particularly the present invention is suited for use, but not exclusively, with XML documents/files.

BACKGROUND AND BACKGROUND ART

XML is now in widespread use as a storage or exchange format for documents and data. Such documents and data generally undergo changes and these changes need to be monitored and actions taken based on what changes have been made. There are many implementations of XML comparison technology including that described in EP 1325432 which is an earlier development by the same inventor, the content of which is incorporated by reference, and others including Altova Spy DiffDog™, Microsoft™ Diff and Patch, IBM Alphaworks™ XMLcmp™, Versim™. Generally these take two markup language documents and generate some representation of the differences between them, often referred to as a 'delta' file.

Another set of problems specifically relating to representing changes between three or more documents is addressed in EP 2174238 which is also an earlier development by the same inventor, the content of which is incorporated by reference. Alternative approaches to this set of problems generally involve the use of version control systems and their focus is on compact storage of changes and such mechanisms are typically not useful for processing changes. An earlier proposal by the inventor for a format for a multiple version document is DeltaXML Unified Delta™, described in "Russian Dolls and XML: Handling Multiple Versions of XML in XML" XML 2003, December, 2003, USA. This proposal was more suited to the processing of changes between versions and a generic solution was proposed in "A Generalized Grammar for Three-way XML Synchronization" XML 2005, USA. However, a study of this will show that although a generic solution is possible, the architecture and execution is complex. EP 2174238 provided an improvement on this previous work.

The approaches and systems identified above do not, though, enable structural differences between the markup language source files to be represented simply and easily in a delta file. A structural difference is a difference with respect to the element hierarchy, e.g. when a new element is introduced to wrap some existing content. Representing structural differences is a known issue and is referred to as the problem of "overlapping hierarchies", i.e. when a single tree structure is insufficient to describe two or more ways of structuring some information.

In terms of the practical need for representing structural differences a good example is the requirement for The Stationery Office, UK to publish consolidated legislation. Jeni Tennison notes, in an article discussing these issues, the importance of consolidated legislation showing the places where 'current' legislation was amended over time from its original, enacted state and the fact that the authors of legislation care little for document structures, and amendments often overlap document structures such as paragraphs and list items, and each other.

In the above example, for legal documents it is changes to the actual text that is deemed to be most important but the XML document format used to represent legislation would use the XML structure to represent the layout of the document, including sections, paragraphs, lists and tables. Although the delta format described in EP 2174238 would be capable of representing successive versions of such a legal document, it would in some cases be necessary to add and delete sections of content simply because of changes to the structure and layout. This is not ideal because the delta document will indicate changes to the legislative text when there may be no changes to the actual text, but only to the structure or layout.

The general problem of overlapping hierarchies has been discussed for some years. In an article about non-hierarchical structures (which includes overlapping hierarchies) issued by the Text Encoding Initiative (TEI) consortium it was noted that: "non-nesting information poses fundamental problems for any XML-based encoding scheme, and it must be stated at the outset that no current solution combines all the desirable attributes of formal simplicity, capacity to represent all occurring or imaginable kinds of structures, suitability for formal or mechanical validation." (see http://www.tei-c.org/release/doc/tei-p5-doc/en/html/NH.html)

In an article at http://www.jenitennison.com/blog/taxonomy/term/9 by Jeni Tennison a summary of the current approaches may be found and is presented below in Table 1. It should be noted, though, that recent work has focused on the problem of overlapping hierarchies within a single document by which is meant overlapping hierarchies in a document where the content, i.e. the text, is unchanged. Existing work in this area has failed to develop a simple and easy way of representing changes to content in addition to overlapping hierarchies.

TABLE 1

| Technique | Advantages | Disadvantages |
| --- | --- | --- |
| Milestones | easy to see main structure | favours one main structure; hard to identify content of overlapping structures |
| fragmentation | easy to see main structure; easy to work out content of overlapping structures | favours one main structure; leads to spurious containment; can lead to discontinuous elements |
| Flattened | all structures treated equally | hard to see any structure; hard to process naturally using XML tools |
| stand-off | all structures treated equally | hard to see any structure; hard to process naturally using XML tools |
| multiple document | easy to see individual structures | hard to edit without tools content gets repeated; complex to align structures; hard to do cross-hierarchy analysis; hard to edit without tools |

Milestones

The applicant has previously proposed a solution (see http://www.deltaxml.com/attachment/481-dxml/XML-change-tracking.pdf) which is geared towards change tracking. However within this solution it is not possible to extract or process a particular version without working back through all the versions prior to the latest version of the document. This is because each change is represented as an incremental 'roll-back' from the latest version of the document, and a roll-back can typically only be applied if all later roll-backs have been applied. Moreover, this approach suffers from the disadvantages of milestones noted in Table 1: it is good for representing tracked changes but poor for processing multiple hierarchies.

Fragmentation

In an article (http://www.jenitennison.com/blog/node/98) by Jeni Tennison labelling of elements is proposed to make extensible stylesheet language transformation (XSLT) processing simpler. However the labelling is done as an automated process which needs to know which element name relates to which hierarchy. The proposed method is, though, limited. The method uses id attributes to indicate that one element is the same as another, i.e. that the 'original' element is a concatenation of all elements with the same id. This would not allow an element fragment to be, for example, part of the same element type but in two different versions. This is because only one id attribute is allowed.

Stand-Off Markup

Stand-off markup, which is also known as remote markup or stand-off annotation, is the kind of markup that resides in a location different from the location of the data being described by it. It is thus the opposite of inline markup where data and annotations are intermingled within a single location [see http://wiki.tei-c.org/index.php/Stand-off markup]. Documenting changes to content as well as overlapping hierarchies is easier to do using stand-off markup because content fragments can be defined and then referenced from different hierarchies.

However, stand-off markup is not easy to process with XSLT because the hierarchies are separated and not related except by content of the leaf or text nodes. Therefore it is powerful in terms of the structures it can represent but weak in terms of how it represents the relationship between the structures.

Multiple Document

This is similar, in some ways, to the delta format described in EP 2174238 in that it cannot show the relationship between the content of different element types, these need to be in separate document fragments. Therefore it is not good for overlapping hierarchies.

SUMMARY OF THE INVENTION

The present invention seeks to address the problems identified above and to add to EP 2174238 the ability to handle changes to structural content.

In contrast with existing methods, the present invention seeks to provide a method and a system capable of representing changes to textual content having commonality of structure and changes to structure having commonality of textual content in one document.

The present invention further seeks to solve the problem of recording changes for overlapping hierarchies for cases where each of the original hierarchies are properly nested, i.e. a tree structure. This is not the only problem involving overlapping hierarchies but it is one of the most common.

The present invention therefore provides a method of representing differences between two or more markup language source files in one markup language delta file, the method comprising the steps of:
  a) creating a delta file with a root element of the same type as the root element of one or more of the source files where element of the same type means an element with the same name and namespace;
  b) identifying structurally significant elements in the two or more source files and determining a preferred alignment, constrained by document order, of the two or more source files, the preferred alignment of the two or more source files being determined with respect to structurally significant elements and textual content;
  c) determining which subtrees in the source files are common to two or more of the source files with respect to the preferred alignment;
  d) recording in the delta file common subtrees as equal; and
  e) recording in the delta file according to the preferred alignment information about the contents of the two or more source files which is not common to all the source files such that each element in the source files will have the same type as the corresponding one or more elements in the delta file and will have at least corresponding ancestor elements of the same type up to and including the root element, and any text node or element directly or indirectly within an element in a source file will have a corresponding text node or element contained directly or indirectly within the corresponding element in the delta file,
whereby the preferred alignment reduces repetition in the delta file of common content structured differently in different source files.

In a separate aspect the present invention provides a tangible medium storing computer readable instructions for generating a delta file representing differences between two or more markup language source files, the computer readable instructions comprising:
  a) instructions for creating a delta file with a root element of the same type as the root element of one or more of the source files where element of the same type means an element with the same name and namespace;
  b) instructions for identifying structurally significant elements in the two or more source files and determining a preferred alignment constrained by document order, of the two or more source files, the preferred alignment of the two or more source files being determined with respect to structurally significant elements and textual content;
  c) instructions for determining which subtrees in the source files are common to two or more of the source files with respect to the preferred alignment;
  d) instructions for recording in the delta file common subtrees as equal; and
  e) instructions for recording in the delta file according to the preferred alignment information about the contents of the two or more source files which is not common to all the source files such that each element in the source files will have the same type as the corresponding one or more elements in the delta file and will have at least corresponding ancestor elements of the same type up to and including the root element, and any text node or element directly or indirectly within an element in a source file will have a corresponding text node or element contained directly or indirectly within the corresponding element in the delta file,
whereby the preferred alignment reduces repetition in the delta file of common content structured differently in different source files.

In a yet further aspect the present invention provides a tangible medium storing a computer readable delta file being a representation of differences between at least two markup language source files and having a document order, the document order of the delta file being defined by a preferred alignment of the at least two markup language source files, constrained by document order, the preferred alignment having been determined with respect to structurally significant elements and textual content in the at least two markup language source files, the delta file having a root element of the same type as the root element of one or more of the source files where element of the same type means an element with the same name and namespace; the delta file containing information about the contents of the at least two source files which is not common to all the source files wherein each element in the source files has the same type as the corresponding one or more elements in the delta file, elements of the same type being elements with the same name and namespace; each ancestor element in the source files has the same type as one or more corresponding ancestor elements in the delta file up to and including the root element; any text node or element directly or indirectly within a source file element has a corresponding text node or element contained directly or indirectly within the corresponding delta file element; and the equality of any subtrees in the source files are indicated in the delta file at each level in the tree structure whereby the preferred alignment reduces repetition in the delta file of common content structured differently in different source files.

In a preferred embodiment at least one first part of the preferred alignment for the two or more source files is based upon structurally significant elements and at least one second part of the preferred alignment for the two or more source files is based upon textual content. Furthermore, the at least one second part of the preferred alignment may be nested within the at least one first part of the preferred alignment.

Optionally when determining the preferred alignment structurally insignificant elements are not aligned other than as an inevitable consequence of alignment of the structurally significant elements and the textual content. Alternatively, structurally insignificant elements may be aligned but only where this does not alter the preferred alignment of structurally significant elements and textual content.

Ideally where a plurality of possible alignments for the same structurally significant element are available within the constraints of document order, a preferred alignment is selected in accordance with one or more predetermined rules.

Also, in a particularly preferred embodiment, a structurally significant element in two or more source files which differs only in content is identified as a common but fragmented element.

Ideally, a structural attribute of an element not common to all the source files is recorded in the delta file only once.

Moreover, one or more attributes are preferably added to one or more of the elements in the delta file to indicate generalized equality relationships between each element as it appears in one or more of the source files.

In a particularly preferred embodiment each element or text node in the delta file includes information indicating in which source files it appears and whether or not it is the same or different in each of the source files, except where this information is contained within information on the parent node.

The structurally significant elements may be identified by identifying structurally insignificant elements and ignoring the structurally insignificant elements when determining the preferred alignment.

In one particularly preferred embodiment any attribute, text string or subtree that is the same in all of the markup language source files is omitted from the delta file.

Optionally, the delta file may be adapted to enable one or more of the source files to be extracted using XQuery.

The method and system of the present invention uses inline markup without any requirement for ID or similar references to indicate the relationship between every element in every source document. The present invention is able to represent any combination of textual content and structure in the source documents. Moreover, deltatags are only needed when there are differences in the structural content, i.e. where an element tag appears in only some of the documents that are mentioned in the logdelta attribute for the element.

Thus in contrast with existing systems capable of recording changes to markup language documents, which are able to document dissimilar content within commonality of structure, the present invention is in addition able to document commonality of content within dissimilar structure.

BRIEF DESCRIPTION OF THE DRAWINGS

An embodiment of the present invention will now be described by way of example only with reference to the accompanying drawings, in which:

FIG. 4 is a diagram of the method steps for recording in a delta file the differences and similarities between a plurality of markup language source documents, in accordance with the present invention.

DETAILED DESCRIPTION OF AN EXEMPLARY EMBODIMENT

The multi-version document created using the method of the present invention is a delta file which is an improvement of the Logical Delta™ file described in EP 2174238, the contents of which is incorporated herein by reference. Generation of a delta file using the system and method described herein is applicable to any number of markup language source documents and has the important characteristic that when one or more documents are removed, the resultant delta file is still a delta document, i.e. it continues to adhere to the delta file requirements and as such is valid (reference herein to valid and validation is to be understood as reference to the file being valid as described at paragraph [0046]).

Figure 1:
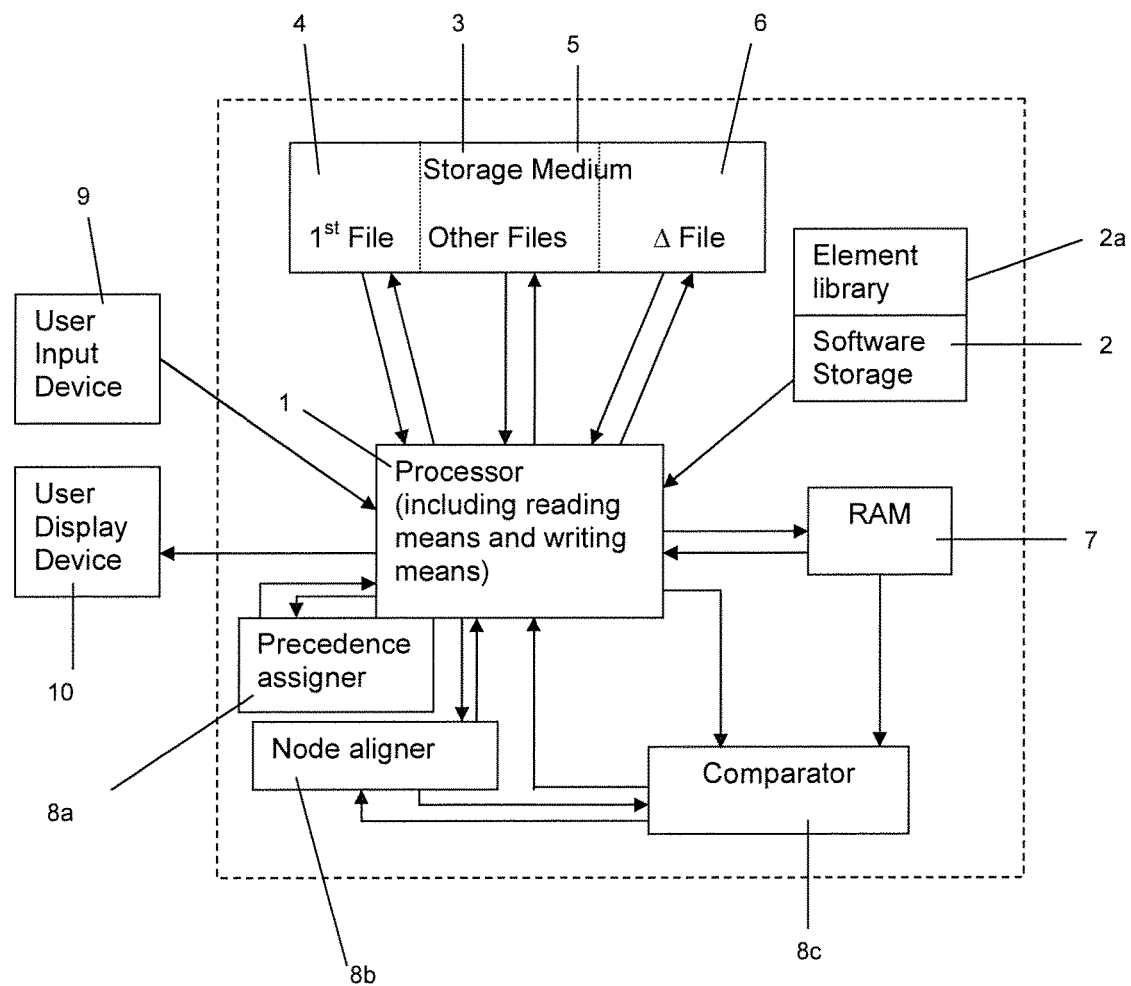
FIG. 1 is a schematic diagram of a hardware implementation in accordance with the present invention.

As illustrated in FIG. 1, a system for recording both content and structural changes to one or more markup language source files comprises: one or more processors 1 for performing the functional operations of the change recordal method described herein; program storage 2 in the form of any suitable read only or read/write tangible memory and including an element library 2a; a data storage device 3 in the form of any suitable read/write tangible memory which, for ease of reference, may be sub-divided into first 4, second 5 and third 6 etc. storage regions; additional cache in the form of RAM 7 for temporary storage of data whilst the program is running; a comparator 8c for comparing the contents of XML files; document precedence assigner 8a, a node aligner 8b, and user input and output interfaces 9, 10. Most conveniently, the program is implemented on a conventional server or tabletop or laptop computer. However, the method of generating a delta document described herein is not restricted to such an implementation.

Using the methodology described in EP 2174238 attributes are used within the delta document (otherwise known as inline markup) to indicate the status of each element in terms of whether it is present in one or more of the original source documents and whether this element is 'equal' in the source documents. In the case of three or more source documents the attributes are able to indicate in which of the source documents the element is equal and in which of the source documents the element is not equal. These attributes are referred to herein as Logical Delta™ attributes but it should be understood that the definition of 'equal' is potentially different for each of the Logical Delta™ attributes.

In contrast to the method in EP 2174238 the Logical Delta™ attribute functionality is extended to additionally identify equality and differences in the source documents hierarchical structures. A deltatag is used to identify a difference in hierarchical structure between two or more source documents, with a separate deltatag being used for each structural difference.

There are four types of deltatag attribute as shown in Table 2 below. Note that 'dx:' is used as the normal convention for an element namespace prefix.

2. The function is commutative.
3. The function returning TRUE is transitive in that if A=B and B=C then A=C.
4. The function always returns the same value for two specific elements, and it returns the same value when one or other of these elements is replaced by an element that is deep-equal to the original one, e.g. with changed attribute ordering.

For the avoidance of doubt, where a Logical Delta™ attribute does not explicitly appear in the delta file it is assumed to be the same as its parent and this applies recursively up to the root element of the file.

An example is the value for an element that occurs in two documents, where the documents have document identifiers 'A' and 'B'. The relation 'A=B' means that the element as it appears in document 'A' is 'equal' to this element as it appears in document 'B'. The relation 'A!=B' means that the element as it appears in document 'A' is 'not equal' to this element as it appears in document 'B'.

This form of value has the characteristic that it can be extended to three or more documents. Thus for three documents A, B and C, examples of relations include 'A=B=C', 'A!=B=C', 'A=B!=C', 'A=C!=B'. Note that any 'equal' documents are grouped, for example A=B!=C=D, or A=C!=B!=D. Here, 'equal' (=) has precedence over 'not equal' (!=), so that the examples are equivalent to:

TABLE 2

| Attribute name | Content | Description |
| --- | --- | --- |
| dx:deltaTag | A list of one or more comma-separated document identifers in alphabetical order, e.g. "A", "B", "A, B" | Indicates that the element tag was present in the document(s) identified, and all of its content is as included in this element in the delta file. |
| dx:deltaTagStart | As above | Indicates that the element tag was present in the document(s) identified, but in that document the element contained not only the content here but more content. The additional content follows in zero or more elements marked dx:deltaTagMiddle and ending with an element marked dx:deltaTagEnd. |
| dx:deltaTagMiddle | As above | Indicates that the content of this element was included in an element marked dx:deltaTagStart which precedes this element. There is additional content, which follows in an element marked dx:deltaTagMiddle or dx:deltaTagEnd. |
| dx:deltaTagEnd | As above | Indicates that the content of this element was included in an element marked dx:deltaTagStart which precedes this element and this element contains the last part of the content for this element. |

In the delta document one Logical Delta™ attribute is present explicitly or implicitly on every element, which is named the logdelta attribute. The definition of 'equal' for the logdelta attribute is deep-equal, as defined in [XQuery 1.0 and XPath 2.0 Functions and Operators, W3C Recommendation 23 Jan. 2007, http://www.w3.org/TR/2007/REC-xpath-functions-20070123/ "XPath 2.0", 2004, Michael Kay, Wiley ISBN 0-764-56910-4], the contents of which is incorporated herein by reference. For other Logical Delta™ attributes both the name of the attribute and the definition of 'equal' will vary. The only requirements are that the definition of 'equal' adheres to the following:

1. The function returns the result TRUE or FALSE given any two subtrees.

(A=B)!=(C=D), and (A=C)!=B!=D respectively. The relation 'equal' is also transitive, and although 'not equal' is not generally transitive, in this case it is because we require that any subtree that is 'equal' to any other must be in the same "equal set", therefore any two subtrees in different "equal sets" are by definition 'not equal', hence 'not equal' is transitive in this situation. Because both relations are also commutative, in this context, the order can be varied to generate a canonical form.

Because of the ease of processing, preferably there is a single canonical string to represent any set of 'equal' documents, the following algorithm is used to generate the Logical Delta™ values:

1. Take the first (in alphabetical order) document indicator, e.g. A;
2. Concatenate this with all other document indicators for documents that are 'equal', in alphabetical order, separated by an '=' sign, to form an "equal set";
3. Take the next in alphabetical order from any remaining in the set of documents that have not yet been used;
4. Repeat steps 2 and 3 until all documents have been referenced;
5. For each equal set that does not include all document indicators, concatenate the first document indicator with all other document indicators that have equality in textual content, in alphabetical order, separated by an '=' sign, to form an "equal set";
6. Take the next document indicator in alphabetical order from any remaining in the set of documents that have not yet been used and repeat step 5;
7. Concatenate each of the equal sets in the order they were generated using '≠' to indicate inequality.

There are two independent variants of the change recordal system and method described herein:
  1. Changes-only methodology which does not contain any data that is common to all of the documents.
  2. Canonical methodology which has all text and attributes wrapped in special elements even when they have not been changed.

The changes-only methodology maintains the concept of a 'changes only' delta and a 'full context' delta, as defined in EP1325432 and EP2174238. The changes-only methodology suppresses unchanged data so is smaller than the full context delta and shows only changes i.e. content is excluded where all the documents are equal. Any one of the original source documents may then be combined with the 'changes only' delta file to generate any of the other source documents. Due to its smaller size, the changes only delta file provides a more secure form of information transfer.

The canonical or full-content methodology is advantageous for most processing purposes as it holds text, attributes and subtrees that have no variations, either because they were present in only one document or because they were present in more than one but were equal in all of them, in the same structure as in the original document. There are some processing situations where it is advantageous to have all text and attributes in the same format, independent of changes. In these cases this methodology provides a canonical form whereby all text items and attributes are wrapped even when they have not changed.

A delta document is valid where at least the following are all true:
  1. Extracted Documents Valid:
  Any individual document X extracted from the delta file is deep-equal to the document X that was added. In accordance with XQuery 1.0 and XPath 2.0 Functions and Operators, W3C Recommendation 23 Jan. 2007 (http://www.w3.org/TR/2007/REC-xpath-functions-20070123/, mentioned earlier) this means that they must contain items that are pairwise deep-equal; and for two items to be deep-equal, they must either be atomic values that compare equal, or nodes of the same kind, with the same name, whose children are deep-equal. In other words, the items in corresponding positions in each sequence must be deep-equal to each other and if the items are nodes, they are compared by examining their children and attributes recursively.
  2. Logical Delta™ Attributes Valid:
  Any Logical Delta™ attribute on any element, including the root element, contains a superset of all of the document identifiers mentioned in the Logical Delta™ attributes of the same name on all of its child elements. All Logical Delta™ attributes on the same element will contain the same set of document identifiers.
  3. Logdelta Attributes Valid:
  The logdelta attribute on each element, including the root element, is a valid Logical Delta™ attribute and:
  If two document subtrees are denoted as equal, then any sublement that references either document must reference both and indicate that they are equal, either explicitly in the logdelta attribute or implicitly by omission of the logdelta attribute because the value of the logdelta attribute is the same as that of its parent element.
  If two document subtrees are denoted as not equal then if the subtrees are extracted there must be a difference between them.
  4.
  All Subset Deltas Valid: If any one document is removed from a delta file of three or more documents then the delta file remaining is valid.
  5. Deltatag attributes valid:
  Only documents that are mentioned in the logdelta attribute of an element may be mentioned in the deltatag attribute and each document is mentioned at most once in any set of deltatag attributes on an element and the start, middle and end deltatags are consistent with one another per Table 2 above.

Figure 2:
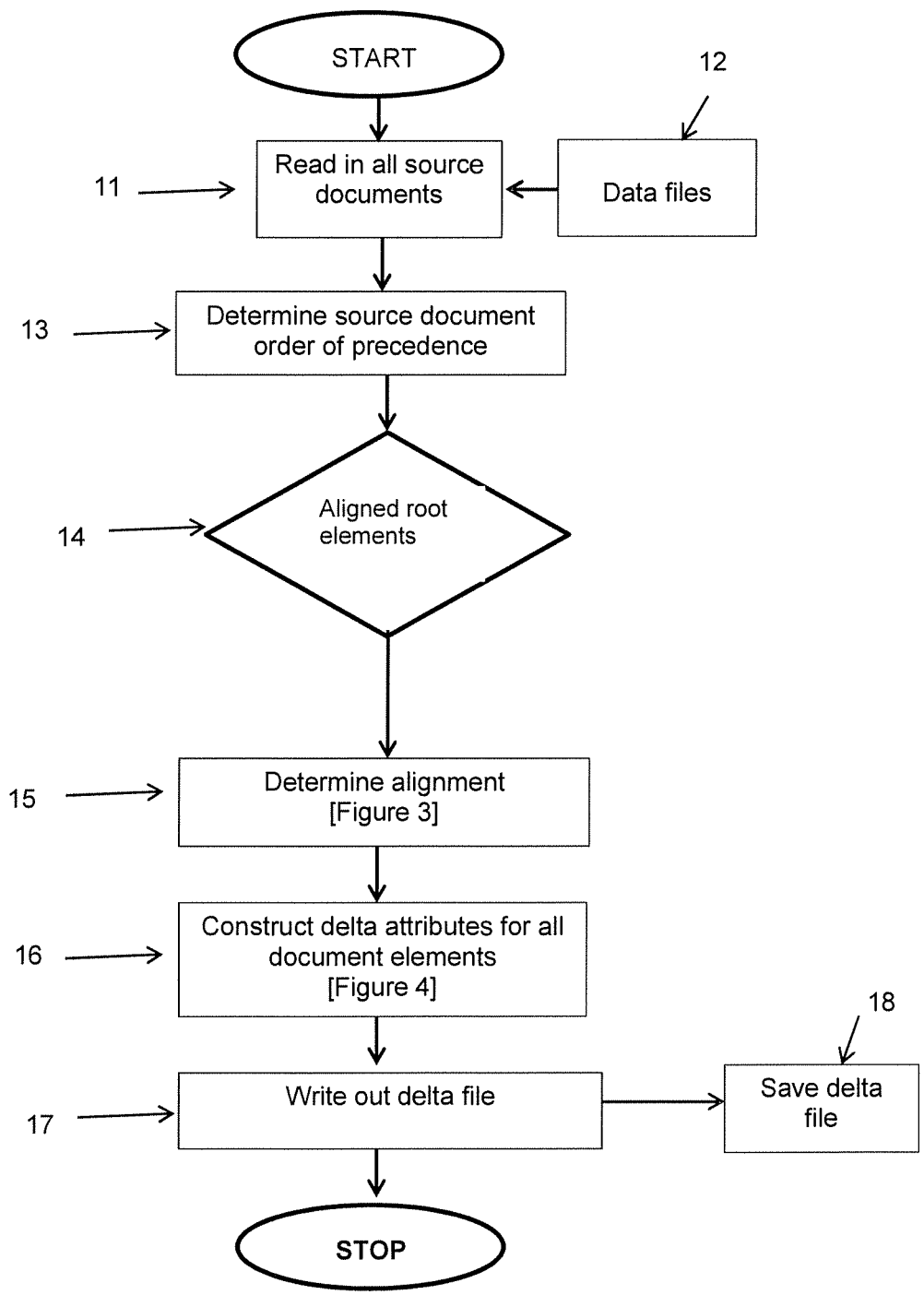
FIG. 2 is a diagram of the method steps for the creation of a delta document, in accordance with the present invention.

A method for constructing a delta document from two or more input files is illustrated in FIG. 2. First the markup language source documents 12 are read 11 into the data storage. Document precedence or order of priority is determined 13 for the source documents. This identifies the order in which the source documents are successively to be processed so as to maximise preservation of the hierarchy of the source document assigned the highest priority. A user may input a preferred order of importance for one or more of the source documents or the order of importance may be determined automatically based on one or more factors such as, but not limited to, the qualifications of the author or date of creation e.g. the most recent source document being assigned the highest priority.

The next step is to determine, for each of the source documents which structural elements can be aligned with which structural elements in another source document (according to the alignment rules). For example, it might be determined that a particular structural element could only be matched to a structural element in another document which has exactly the same type, i.e. same local name and namespace. In another case, it may be determined that a structural element does not need to be mapped to any other structural element in another document because it is an optional part of the hierarchy, for example the <div> or <span> element in HTML. In another situation, structural elements that have similar meaning could be aligned with each other, for example the heading elements h1 and h2 in HTML. These rules will depend on the semantics of the document schema and the semantics of each element tag.

By definition the root node in each source document can be aligned with the root node in the other source documents. Typically the root nodes will be the same type. Therefore root elements are aligned 14. Next, element alignment is determined for each source document 15 as illustrated in greater detail in FIG. 3, then delta elements are generated 16 by identifying equalities and inequalities between the source documents for each document element including the root element, as illustrated in greater detail in FIG. 4. Once completed, the delta document is written out 17 and may be recorded on a disk or some other form of document storage 18 and the process is finished.

Figure 3:
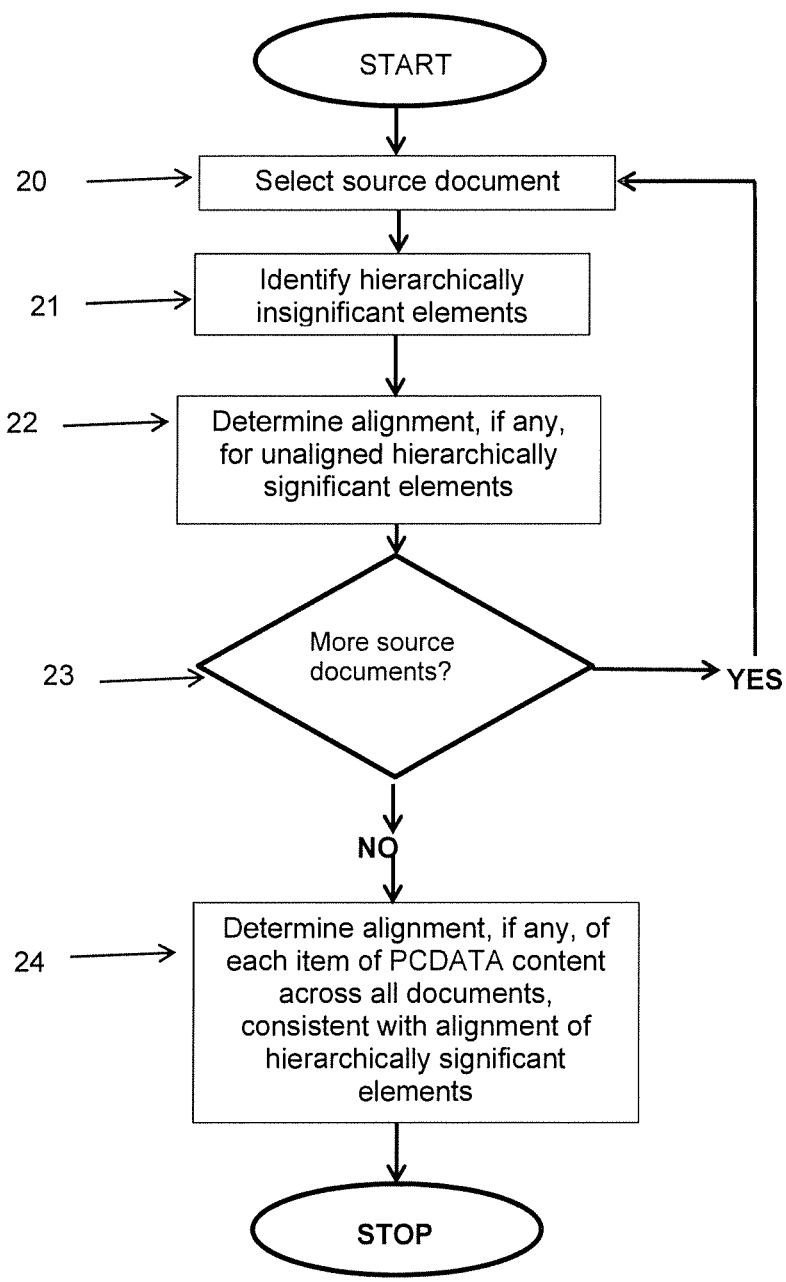
FIG. 3 is a diagram of the method steps for determining element and text alignment between two or more markup language source documents in accordance with the present invention.

FIG. 3 illustrates how elements and textual content are aligned. A markup language source document is selected 20. Preferably, the source document is selected in accordance with the order of precedence assigned to the source documents, so that when the process first starts the source document assigned highest priority is selected. Approaches to source document selection, not necessarily involving document precedence, may alternatively be employed.

With the source document selected, the first step is to identify automatically structurally insignificant (i.e. hierarchically insignificant) elements in the source document 21. Structurally insignificant elements include elements for which the document remains meaningful and useful if the element were to be omitted and/or elements having content that could exist as a child node of the element's parent. Structural insignificance is dependent on the specific use case and could vary depending on a particular user's requirements. Examples of structurally insignificant elements include, but are not limited to: optional wrapper elements such as <div> in HTML, formatting elements such as <bold> and <italic> and non-optional wrapper elements where content can flow between adjacent elements such as <p> or <para>. Preferably data on all possible structurally insignificant elements are stored in the element library 2a and structurally insignficant elements in a source document are identified by comparing each element in the source document in turn with the contents of the element library 2a to identify matches. In addition or alternatively, structurally insignificant elements in a source document may be identified by deleting each element, but not its content, of a source document in turn and checking whether the resulting source document remains meaningful and useful, and preferably is valid i.e. conforms to the relevant schema or document type definition. With all structurally insignificant elements identified, all remaining elements in a source document are deemed structurally significant elements.

The next step is to determine automatically for each structurally significant element of the selected source document in turn (but not necessarily constrained by the element hierarchy) the zero or more structurally significant elements having the same type or meaning in each of the other source document(s) with which each element of the selected source document could be aligned 22. Note that each successive alignment must follow the previous alignment in document order for each source document i.e. the alignment determines a series of non-intersecting links between elements in different source documents.

Where there are only two source documents, all unaligned structurally significant elements in the second source document are deemed to not be aligned. Where there are more than two source documents, the next source document is selected 20 and the process described above is repeated: structurally insignificant elements in the next source document are identified 21 and then for each currently unaligned structurally significant element in the next source document it is determined 22 whether each one of the currently unaligned structurally significant elements could be aligned with none, one or more unaligned structurally significant elements in any other source documents. Consider three documents A, B and C. Having aligned all structurally significant elements in document A with those in documents B and C, if there are any unaligned structurally significant elements in B then these might still be aligned with elements in C having regard to document order. This process is repeated until there are no structurally significant elements in any source documents that have not been checked for alignment.

Although the above has been described as a two stage process, it is to be understood that these two stages may be combined. With the two stages combined each element of a source document is, in turn, checked initially whether it is structurally insignificant. Where the element is determined not to be structurally insignificant, i.e. it is determined to be structurally significant, possible alignments of the structurally significant element are then identified. If, however, the element is determined to be structurally insignificant no possible alignments of the structurally insignficant element are identified and the process moves to check the structural signficance of the next element in the source document.

At the end of the process, there will exist an alignment (even if the alignment is minimal i.e. no structurally significant elements in any of the source documents are aligned) in document order for the structurally significant elements in the source documents. The PCDATA content of the structural elements is then aligned automatically with PCDATA content in the other documents 23, constrained by document order and the alignment of structurally significant elements only. Alignment of the PCDATA content is independent of the structurally insignificant elements. Note that although this is a final step, the PCDATA content may already have been fully aligned when the structurally significant elements were aligned. The PCDATA content is aligned so as to substantially avoid, where possible, repetition of content common to more than one source document. Alignment of the PCDATA content may be determined using one of a number of different established techniques such as, but not limited to, identifying the longest common substrings by applying, for example, a minimum edit distance rule.

No mention has been made in the above algorithm of other attributes in the documents including the structurally insignificant elements. Following the alignment of structurally significant elements, attributes can be aligned trivially according to their names, and each attribute that is unchanged across the documents is simply represented as an attribute in the delta file. If an attribute has changed, then markup will be created to represent the change using dxl: attributes as in EP 2174238. However, the handling of these attributes has no fundamental effect on the alignment and construction of the delta file.

Thus the alignment will not be constrained, in all cases, by the hierarchy of each element, content can be aligned even if its parent element is not aligned. Furthermore, the alignment of structurally significant elements defines boundaries within which content alignment may be beneficial in contrast to conventional element alignment. Thus, one or more first parts of the delta file may reflect document differences based on structural alignment whereas one or more second parts of the delta file may reflect document differences based on content alignment. Moreover, the one or more second parts may be nested within the one or more first parts.

At step 22, there will be occasions when an element may be aligned in a plurality of different ways. The system is programmed so that where there are different ways in which elements can be aligned, a choice is made automatically between the different alignment options. This choice can be programmed to take account of the intended use of the resultant delta file. A typical choice would be to minimise the size of the delta file in which case an alignment maximising the number of aligned elements is chosen. There are many established techniques that might be applied to achieve this, for example the calculation of a minimum edit distance.

Once alignment is complete. the next step is to determine the deltaTag and delta attributes that are needed to represent the differences between the aligned source documents. There are various ways in which the content of the delta file is represented. The algorithm shown in FIG. 4 and described below sets out one way of doing this, but other ways may be employed provided that the result conforms to the rules for the delta file. To record differences between the source documents in a delta file, each element of the source documents is flattened 25. This is done by representing the start tag and the end tag and some linking mechanism between them such that the hierarchy of each one of the source documents can be reconstructed. The source documents are then merged into a single linear structure where the document order for each source document is preserved and the alignment (previously determined according to FIG. 3) is preserved by not repeating aligned common structure or content.

Taking the source document with highest priority, its hierarchy is reconstructed by reconstructing each element from its start tag and corresponding end tag 26. As each element is reconstructed, the delta attribute will be set according to the alignment of content across the documents and whether or not these are all equal. If the element tag does not appear in all of the source documents that are referenced within the delta attribute, then the deltaTag attribute will also need to be set accordingly. Once the reconstruction of the hierarchy of the highest importance source document is completed, the next highest importance source document is selected and its hierarchy is reconstructed 27 although in this case some of its elements may be fragmented due to the previous hierarchy reconstruction. If an element is fragmented, it will be necessary to set the deltaTagStart, deltaTagMiddle, and deltaTagEnd attributes appropriately.

Where there are more than two source documents 28 the same process is repeated for each of the additional source documents successively until the hierarchies of all source documents have been reconstructed at which point the setting of delta and deltaTag attributes is complete.

As mentioned earlier examples of structurally insignificant elements include optional wrapper elements such as <div> in HTML, formatting elements such as <bold> and <italic> and non-optional wrapper elements where content can flow between adjacent elements such as <p> or <para>. An optional wrapper element is one which can be removed from the hierarchy of the document and the document remains valid.

Formatting elements such as, but not limited to, <bold>, <italic>, and <span> are also optional but typically have the following additional characteristics:
1. Concatenate: in this case two adjacent elements that have the same name and attributes can be concatenated into one without changing the semantics, e.g. <bold>word1</bold><bold> word2</bold> can be represented as <bold>word1 word2</bold>
2. Hierarchical commute: in this case two elements in the same hierarchical class can be commuted in the hierarchy without changing the semantics, e.g. <bold> and <italic> so that <bold><italic>word</italic></bold> can be represented as <italic><bold>word</bold></italic>.

A non-optional wrapper element or 'flow' wrapper element needs to be temporarily removed before comparison for alignment purposes, because it imparts structure to the document, but will be represented in the delta file and so can be re-instated as needed. An example of a non-optional wrapper element is <p> or <para>. With non-optional wrapper elements content can 'flow' between adjacent elements of the same type. The following is a simple example of how the method and system described herein is able to avoid repetition of content (in comparison to conventional systems) flowing between adjacent non-optional wrapper elements of the same type.

Document A

<p>The quick brown fox jumped over the lazy dog. </p>
<p>To be sure. That was a great idea</p>

Document B

<p>The quick brown fox jumped over the lazy dog. To be sure. </p>
<p>That was a great idea</p>

Delta File:

<doc-delta >
    <p deltaxml:deltaTagStart="B" deltaxml:deltaTag="A" deltaxml:deltaV2="A!=B">The quick brown fox jumped over the lazy dog.</p>
    <p deltaxml:deltaTagEnd="B" deltaxml:deltaTagStart="A" deltaxml:deltaV2="A!=B"> To be sure.</p>
    <p deltaxml:deltaTagEnd="A" deltaxml:deltaTag="B" deltaxml:deltaV2="A!=B"> That was a great idea</p>
</doc-delta>

The following examples illustrate how both content and structural changes to one or more markup language source files are recorded. In these examples extensible hypertext markup language (XHTML) is used as an example of an XML language format. The method and system are not, though, limited to XHTML or even HTML source files.

A common change to text is that addition of a bold tag around some words as follows:

Example 1

The markup language source file contains:
    <p>Here is some bold text.</p>
This is modified in the markup language source file to:
    <p>Here is some <b>bold</b>text.</p>
Using the system and method described in EP 2174238 the word 'bold' must be deleted and added in combination with the bold formatting:

<p dx:deltaV2="A!=B">Here is some
    <dx:textGroup dx:deltaV2="A">
        <dx:text dx:deltaV2="A">bold</dx:text>
    </dx:textGroup>
    <b dx:deltaV2="B">bold</b>
    text.</p>

Using the method described herein the change is recorded in the delta document as:

<p dx:deltaV2="A!=B">Here is some
    <b dx:deltaV2="A!=B" dx:deltaTag="B">bold</b>
    text.</p>

Thus, using the method described herein recording a change involving adding bold formatting to the word "bold" does not require the word "bold" to be deleted and re-added. As a result the record for this change is simple and brief.

Example 1 above shows that with the addition of the new deltaTag attribute, it is possible to indicate that the bold tag is only present in the B document. Another example in XHTML would be the addition of a <div> tag around multiple paragraphs and here the example clearly illustrates the advantage of being able to represent structural changes in the Delta file—remember that the <div> might have been put round a large part of a large document, rather than a couple of paragraphs as shown here.

Example 2

The markup language source file contains:

```
<body>
  <p>Here is a first paragraph.</p>
  <p>Here is a second paragraph.</p>
</body>
```

This is modified in the markup language source file to:

```
<body>
  <div>
    <p>Here is a first paragraph.</p>
    <p>Here is a second paragraph.</p>
  </div>
</body>
```

Using the system and method described in EP 2174238 the change is recorded as:

```
<body dx:deltaV2="A!=B">
  <p dx:deltaV2="A">Here is a first paragraph.</p>
  <p dx:deltaV2="A">Here is a second paragraph.</p>
  <div dx:deltaV2="B">
    <p>Here is a first paragraph.</p>
    <p>Here is a second paragraph.</p>
  </div>
</body>
```

Using the method described herein the change is recorded in the delta document as:

```
<body dx:deltaV2="A!=B">
  <div dx:deltaTag="B" dx:deltaV2="A!=B">
    <p dx:deltaV2="A=B">Here is a first paragraph.</p>
    <p dx:deltaV2="A=B">Here is a second paragraph.</p>
  </div>
</body>
```

This system and method for recording changes to markup language files extends to much more complex examples, in fact any form of structural difference between two documents where the content is the same can be represented without requiring the content to be deleted and represented. Moreover, as this system and method is an improvement of the method described in EP 2174238, the improved system and method benefits from the advantages inherent in the earlier method. In particular the system and method described herein is able to record changes to content as well as structure. Also the system and method described herein is scalable and is capable of recording separate changes in one, two, three or more related markup language source files.

Example 3

The following is a larger example showing one text change and two hierarchies that are independent.

Markup Language Document A:

```
<book>
  <p>
    <seg>Scorn not the sonnet;</seg>
    <seg>critic, you have frowned, Mindless of its just honours;</seg>
    <seg>with this key SHAKESPEARE unlocked his heart;</seg>
    <seg>the melody Of this small lute gave ease to Petrarch's wound.</seg>
  </p>
</book>
```

Markup Language Document B:

```
<book>
  <l>Scorn not the sonnet; critic, you have frowned,</l>
  <l>Mindless of its just honours; with this key</l>
  <l>Shakespeare unlocked his heart; the melody</l>
  <l>Of this small lute gave ease to Petrarch's wound.</l>
</book>
```

The differences between markup language source files A and B are represented using the system and method described herein by:

```
<book xmlns:dx="xx" dx:deltaV2="A!=B">
  <p dx:deltaV2="A!=B" dx:deltaTag="A">
    <seg dx:deltaV2="A!=B" dx:deltaTag="A">
      <l dx:deltaV2="A!=B" dx:deltaTagStart="B">Scorn not the sonnet;</l>
    </seg>
    <seg dx:deltaV2="A!=B" dx:deltaTag="A">
      <l dx:deltaV2="A!=B" dx:deltaTagEnd="B">critic, you have frowned, </l>
      <l dx:deltaV2="A!=B" dx:deltaTagStart="B"> Mindless of its just honours;</l>
    </seg>
    <seg dx:deltaV2="A!=B" dx:deltaTag="A">
      <l dx:deltaV2="A!=B" dx:deltaTagEnd="B">with this key </l>
      <l dx:deltaV2="A!=B" dx:deltaTagStart="B">
        <dx:textGroup dx:deltaV2="A!=B">
          <dx:text dx:deltaV2="A">SHAKESPEARE</dx:text>
          <dx:text dx:deltaV2="B">Shakespeare</dx:text>
        </dx:textGroup>
        unlocked his heart;</l>
    </seg>
    <seg dx:deltaV2="A!=B" dx:deltaTag="A">
      <l dx:deltaV2="A!=B" dx:deltaTagEnd="B">the melody </l>
      <l dx:deltaV2="A!=B" dx:deltaTag="B">Of this small lute gave ease to Petrarch's wound.</l></seg>
  </p>
</book>
```

This representation makes it much easier to produce certain types of output. For example, it would be quite simple to print the book in a line by line format with a marker to indicate segment breaks. Where there are changes between the two documents, the output could use either the A document or the B document or indicate the changes. Therefore a whole series of different outputs could be created quite simply, thus enabling the content to be reused for many different purposes.

An additional feature of the improved system and method is that the above document could also be represented in a way that preserves more of the B document hierarchy, as shown below.

```
<book xmlns:dx="xx" dx:deltaV2="A!=B">
  <p dx:deltaV2="A!=B" dx:deltaTag="A">
    <l dx:deltaV2="A!=B" dx:deltaTag="B">
      <seg dx:deltaV2="A!=B" dx:deltaTag="A">Scorn not the
        sonnet; </seg>
      <seg dx:deltaV2="A!=B" dx:deltaTagStart="A">critic,
        you have frowned,</seg>
    </l>
    <l dx:deltaV2="A!=B" dx:deltaTag="B">
      <seg dx:deltaV2="A!=B" dx:deltaTagEnd="A">Mindless of
        its just honours; </seg>
      <seg dx:deltaV2="A!=B" dx:deltaTagStart="A">with this
        key</seg>
    </l>
    <l dx:deltaV2="A!=B" dx:deltaTag="B">
      <seg dx:deltaV2="A!=B" dx:deltaTagEnd="A">
        <dx:textGroup dx:deltaV2="A!=B">
          <dx:text dx:deltaV2="A">SHAKESPEARE</dx:text>
          <dx:text dx:deltaV2="B">Shakespeare</dx:text>
        </dx:textGroup> unlocked his heart;</seg>
      <seg dx:deltaV2="A!=B" dx:deltaTagStart="A">the melody</seg>
    </l>
    <l dx:deltaV2="A!=B" dx:deltaTag="B">
      <seg dx:deltaV2="A!=B" dx:deltaTagEnd="A">Of this small lute
gave ease to Petrarch's
        wound.</seg>
    </l>
  </p>
</book>
```

Transformation between these two representations could be achieved quite easily in XSLT and as one form may be more suitable for certain types of output this provides an advantage. This scales to multiple documents in that the user would have a choice as to the priority in how hierarchies were represented in the delta according to the ongoing processing requirements. These could also be transformed as part of an output process.

If the same changes were to be rendered in the TEI format:

```
<books>
  <s-list>
    <s xml:id="s1">Scorn not the sonnet;</s>
    <s xml:id="s2">critic, you have frowned,</s>
    <s xml:id="s3"> Mindless of its just honours;</s>
    <s xml:id="s4">with this key</s>
    <s xml:id="s5"> SHAKESPEARE</s>
    <s xml:id="s6"> Shakespeare</s>
    <s xml:id="s7"> unlocked his heart;</s>
    <s xml:id="s8">the melody</s>
    <s xml:id="s9"> Of this small lute gave ease to Petrarch's
      wound.</s>
  </s-list>
  <book>
    <p>
      <join target="s1" result="seg"/>
      <join target="s2 s3" result="seg"/>
      <join target="s4 s5 s7" result="seg"/>
      <join target="s8 s9" result="seg"/>
    </p>
  </book>
  <book>
    <line-based>
      <join target="s1 s2" result="l"/>
      <join target="s3 s4" result="l"/>
      <join target="s6 s7 s8" result="l"/>
      <join target="s9" result="l"/>
    </line-based>
  </book>
</books>
```

The changes represented using TEI lack any relationship between the two forms making it much more difficult to generate, for example, a line by line format with a marker to indicate segment breaks.

As mentioned earlier the system and method described herein may be applied to two or more source documents. The following is an example in which the method is applied to three source documents showing a text change and two different hierarchies:

Markup Language Document A:

```
<body>
  <div>
    <p>Hello World!</p>
  </div>
</body>
```

Markup Language Document B:

```
<body>
  <p>Hello World!</p>
</body>
```

Markup Language Document C:

```
<body>
  <div>
    <p>Hello brave World!</p>
  </div>
</body>
```

The differences between markup language source files A, B and C are represented using the system and method described herein by:

```
<body xmlns:dx="xx" dx:deltaV2="A!=B!=C">
  <div dx:deltaV2="A!=B!=C" dx:deltaTag="A,C">
    <p dx:deltaV2="A=B!=C">Hello <dx:textGroup
      dx:deltaV2="C">
      <dx:text dx:deltaV2="C">brave</dx:text>
    </dx:textGroup> World!</p>
  </div>
</body>
```

It will be immediately apparent from the above, that the difference recordal system and method described herein is fully scalable i.e. there is no limit to the number of source documents for which differences between the source documents may be recorded.

The system and method described herein is able to generate delta files for any combination of source documents with different hierarchies and can cater for changes in attributes and content for any element. Unlike existing methodologies, for each structural difference the present invention only applies a deltatag when an element tag is not present in all of the source documents that are referenced in the deltaV2 attribute, i.e. only when there is a structural change. In this way the need for every element to be separately tagged can be avoided.

It will be apparent that the system and method described herein may be applied to software environments other than that illustrated herein. Also, changes to the details of the system and method are, of course, possible without departing from the scope of the invention as defined in the appended claims.

What we claim:

1. A method of representing differences between two or more markup language source files in one markup language delta file, the method comprising the steps of:
    a) creating a markup language delta file with a root element of the same type as the root element of one or more of the two or more markup language source files where element of the same type means an element with the same name and namespace;
    b) identifying structurally significant elements in the two or more markup language source files, wherein a structurally significant element is identified by:
        (i) the start tag or end tag of the element is not listed in a library of insignificant element tags, and/or
        (ii) amendment of a respective markup language source file of the two or more markup language source files by removal of the start and end tags of the element and addition of the contents of the element to its parent element causes the respective markup language source file not to conform to its Document Type Definition or Schema;
    c) determining a chosen alignment, constrained by document order, of the two or more markup language source files, the chosen alignment of the two or more markup language source files being determined with respect to structurally significant elements and textual content;
    d) determining which subtrees in the two or more markup language source files are common to two or more of the two or more markup language source files with respect to the chosen alignment;
    e) recording in the markup language delta file common subtrees as equal; and
    f) recording in the markup language delta file according to the chosen alignment information about the contents of the two or more markup language source files which is not common to all of the two or more markup language source files such that each element in the two or more markup language source files will have the same type as the corresponding one or more elements in the markup language delta file and will have at least corresponding ancestor elements of the same type up to and including the root element, and any text node or element directly or indirectly within an element in a in any one of the two or more markup language source files will have a corresponding text node or element contained directly or indirectly within the corresponding element in the markup language delta file,
    whereby the method of representing differences, which reflects the chosen alignment, reduces repetition in the delta file of common content structured differently in different ones of the two or more markup language source files.

2. A method as claimed in claim 1, wherein in step b) at least one first part of the chosen alignment for the two or more markup language source files is primarily based upon structurally significant elements and at least one second part of the chosen alignment for the two or more markup language source files is primarily based upon textual content.

3. A method as claimed in claim 2, wherein the at least one second part of the chosen alignment is nested within the at least one first part of the chosen alignment.

4. A method as claimed in claim 1, wherein in step b) when determining the chosen alignment
    structurally insignificant elements are not aligned other than as an inevitable consequence of alignment of the structurally significant elements and the textual content, or structurally insignificant elements are only aligned where this does not alter the chosen alignment of structurally significant elements and textual content.

5. A method as claimed in claim 1, wherein a structural attribute of an element not common to all of the two or more markup language source files is recorded in the markup language delta file only once.

6. A method as claimed in claim 1, wherein one or more attributes are added to one or more of the elements in the delta file to indicate generalized equality relationships between each element as it appears in one or more of the two or more markup language source files.

7. A method as claimed in claim 6, wherein each element or text node in the markup language delta file includes information indicating in which of the two or more markup language source files it appears and whether or not it is the same or different in each of the markup language source files, except where this information is contained within information on the parent node.

8. A method as claimed in claim 1, wherein in step b) the structurally significant elements are identified by identifying structurally insignificant elements and ignoring the structurally insignificant elements when determining the chosen alignment.

9. A non-transitory tangible medium storing computer readable instructions for generating a delta file representing differences between two or more markup language source files, the computer readable instructions comprising:
    a) instructions for creating a delta file with a root element of the same type as the root element of one or more of the two or more markup language source files where element of the same type means an element with the same name and namespace;
    b) instructions for identifying structurally significant elements in the two or more markup language source files, wherein a structurally significant element is identified by:
        (i) the start tag or end tag of the element is not listed in a library of insignificant element tags, and/or
        (ii) amendment of a respective markup language source file of the two or more markup language source files by removal of the start and end tags of the element and addition of the contents of the element to its parent element causes the respective markup language source file not to conform to its Document Type Definition or Schema;
    c) instructions for determining a chosen alignment, constrained by document order, of the two or more markup language source files, the chosen alignment of the two or more markup language source files being determined with respect to structurally significant elements and textual content;
    d) instructions for determining which subtrees in the two or more markup language source files are common to two or more of the two or more markup language source files with respect to the chosen alignment;
    e) instructions for recording in the delta file common subtrees as equal; and
    f) instructions for recording in the delta file according to the chosen alignment information about the contents of the two or more markup language source files which is not common to all of the two or more markup language source files such that each element in the two or more markup language source files will have the same type as the corresponding one or more elements in the delta file and will have at least corresponding ancestor elements of the same type up to and including the root element, and any text node or element directly or indirectly within an element in any one of the two or more markup language source files will have a corresponding text node or element contained directly or indirectly within the corresponding element in the delta file, whereby the method of representing differences, which reflects the chosen alignment, reduces repetition in the delta file of common content structured differently in different ones of the two or more markup language source files.

10. A non-transitory tangible medium as claimed in claim 9, wherein the instructions for determining a chosen alignment include determining alignment for at least one first part of the chosen alignment based primarily upon structurally significant elements and determining alignment for at least one second part of the chosen alignment based primarily upon textual content.

11. A non-transitory tangible medium as claimed in claim 10, wherein the at least one second part of the chosen alignment is nested within the at least one first part of the chosen alignment.

12. A non-transitory tangible medium as claimed in claim 9, wherein structurally insignificant elements are not aligned other than as an inevitable consequence of alignment of the structurally significant elements and the textual content, or the chosen alignment aligns structurally insignificant elements only where this does not alter the chosen alignment of structurally significant elements and textual content.

13. A non-transitory tangible medium as claimed in claim 9, wherein the f) instructions record in the delta file a structural attribute of an element not common to all of the two or more markup language source files only once.

14. A non-transitory tangible medium as claimed in claim 9 wherein the e) and f) instructions add one or more attributes to one or more of the elements in the delta file to indicate generalized equality relationships between each element as it appears in one or more of the two or more markup language source files.

15. A non-transitory tangible medium as claimed in claim 14, wherein each element or text node in the delta file includes information indicating in which of the two or more markup language source files it appears and whether or not it is the same or different in each of the markup language source files, except where this information is contained within information on the parent node.

16. A non-transitory tangible medium as claimed in claim 9, wherein the instructions for identifying structurally significant elements include instructions for identifying structurally insignificant elements and ignoring the structurally insignificant elements when determining the chosen alignment.

17. A non-transitory tangible medium storing a markup language delta file being a representation of differences between at least two markup language source files which have a document order, the representation of differences in the markup language delta file reflecting a chosen alignment of the at least two markup language source files, constrained by document order, the chosen alignment having been determined with respect to structurally significant elements and textual content in the at least two markup language source files, wherein a structurally significant element is identified by:
  (i) the start tag or end tag of the element is not listed in a library of insignificant element tags, and/or
  (ii) amendment of a respective markup language source file of the two or more markup language source files by removal of the start and end tags of the element and addition of the contents of the element to its parent element causes the respective markup language source file not to conform to its Document Type Definition or Schema;

the markup language delta file having a root element of the same type as the root element of one or more of the at least two markup language source files where element of the same type means an element with the same name and namespace; the markup language delta file containing information about the contents of the at least two markup language source files which is not common to all of the at least two markup language source files wherein each element in the at least two markup language source files has the same type as the corresponding one or more elements in the markup language delta file, elements of the same type being elements with the same name and namespace; each ancestor element in the at least two markup language source files has the same type as one or more corresponding ancestor elements in the markup language delta file up to and including the root element; any text node or element directly or indirectly within a markup language source file element has a corresponding text node or element contained directly or indirectly within the corresponding delta file element; and the equality of any subtrees in the at least two markup language source files are indicated in the markup language delta file at each level in the tree structure whereby the chosen alignment reduces repetition in the markup language delta file of common content structured differently in different ones of the at least two markup language source files.

18. A non-transitory tangible medium storing a markup language delta file as claimed in claim 17, wherein at least one first part of the chosen alignment of the at least two markup language source files is based primarily upon structurally significant elements and at least one second part of the chosen alignment of the at least two markup language source files is based primarily upon textual content.

19. A non-transitory tangible medium storing a markup language delta file as claimed in claim 18, wherein the at least one second part of the chosen alignment is nested within the at least one first part of the chosen alignment.

20. A non-transitory tangible medium storing a markup language delta file as claimed in claim 17, wherein structurally insignificant elements are not aligned in the markup language delta file other than as an inevitable consequence of alignment of the structurally significant elements and the textual content.

21. A method of representing differences between two or more markup language source files in one markup language delta file, the method comprising the steps of:
  a) creating a markup language delta file with a root element of the same type as the root element of one or more of the two or more markup language source files where element of the same type means an element with the same name and namespace;
  b) identifying structurally significant elements in the two or more markup language source files;
  c) determining a chosen alignment, constrained by document order, of the two or more markup language source files, the chosen alignment of the two or more markup language source files being determined with respect to structurally significant elements and textual content in which the chosen alignment does not require alignment of at least one element not identified as a structurally significant element and which is common to two or more of the two or more markup language source files;

d) determining which subtrees in the two or more markup language source files are common to two or more of the two or more markup language source files with respect to the chosen alignment;

e) recording in the markup language delta file common subtrees as equal; and f) recording in the markup language delta file according to the chosen alignment information about the contents of the two or more markup language source files which is not common to all of the two or more markup language source files such that each element in the two or more markup language source files will have the same type as the corresponding one or more elements in the markup language delta file and will have at least corresponding ancestor elements of the same type up to and including the root element, and any text node or element directly or indirectly within an element in any one of the two or more markup language source files will have a corresponding text node or element contained directly or indirectly within the corresponding element in the markup language delta file, whereby the method of representing differences, which reflects the chosen alignment, reduces repetition in the markup language delta file of common content structured differently in different ones of the two or more markup language source files.

\* \* \* \* \*